United States Patent
Orton et al.

(10) Patent No.: US 7,496,672 B2
(45) Date of Patent: Feb. 24, 2009

(54) METHOD AND APPARATUS FOR A SIP CLIENT MANAGER

(75) Inventors: Scott L. Orton, Allen, TX (US); William S. Lee, Plano, TX (US); Mark Holden, Allen, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1053 days.

(21) Appl. No.: 10/718,098

(22) Filed: Nov. 20, 2003

(65) Prior Publication Data

US 2004/0107238 A1    Jun. 3, 2004

Related U.S. Application Data

(63) Continuation of application No. 09/492,046, filed on Jan. 26, 2000, now Pat. No. 6,678,735.

(51) Int. Cl.
    G06F 15/16    (2006.01)
(52) U.S. Cl. .................. 709/230; 709/203; 709/206; 709/225; 709/227; 709/229; 709/232; 709/238; 709/246
(58) Field of Classification Search .............. 709/238, 709/246, 206, 200, 203, 225, 227, 229, 230, 709/232
See application file for complete search history.

(56) References Cited

U.S. PATENT DOCUMENTS

| | | | |
|---|---|---|---|
| 5,539,739 A * | 7/1996 | Dike et al. .................. | 370/352 |
| 5,841,979 A * | 11/1998 | Schulhof et al. ............ | 709/237 |
| 6,230,156 B1 * | 5/2001 | Hussey ........................ | 707/10 |
| 6,237,041 B1 | 5/2001 | Håål et al. ................... | 709/246 |
| 6,247,062 B1 | 6/2001 | Sàrkar ......................... | 709/245 |
| 6,345,302 B1 * | 2/2002 | Bennett et al. .............. | 709/236 |
| 6,363,065 B1 * | 3/2002 | Thornton et al. ............ | 370/352 |
| 6,408,342 B1 | 6/2002 | Moore et al. ................ | 709/330 |
| 6,430,197 B1 | 8/2002 | Park ............................ | 370/471 |
| 6,438,555 B1 * | 8/2002 | Orton ........................ | 707/100 |
| 6,446,127 B1 | 9/2002 | Schuster et al. ............ | 709/227 |
| 6,463,064 B1 | 10/2002 | Broockman et al. ......... | 370/401 |
| 6,477,375 B1 * | 11/2002 | Ho et al. ..................... | 455/445 |
| 6,678,735 B1 * | 1/2004 | Orton et al. ................. | 709/230 |
| 6,735,190 B1 * | 5/2004 | Chuah et al. ................ | 370/352 |
| 6,798,789 B1 * | 9/2004 | Jackson et al. .............. | 370/489 |

* cited by examiner

*Primary Examiner*—Liangche A Wang

(57) ABSTRACT

A method, apparatus, system, and computer program product for communicating using Session Initiation Protocol (SIP) is provided. The method, apparatus, system and computer program product provide mechanisms by which simplified messages may be utilized by client applications such that the client applications need not maintain information pertaining to the routing of messages. The system includes a network interface and a SIP client manager that receives SIP messages through the network interface. The SIP client manager contains a SIP management module and an X-SIP client module. The SIP management module contains a SIP message modifier for modifying incoming messages and outgoing messages in accordance with context information or state information for a session associated with a SIP message, and the SIP management module also contains input/output controllers for receiving, sending, or forwarding SIP messages. The X-SIP client module contains an input/output controller for receiving and sending SIP messages and also contains a SIP application programming interface (API) for handling SIP messages for a SIP-enabled application.

6 Claims, 11 Drawing Sheets

US 7,496,672 B2

METHOD AND APPARATUS FOR A SIP CLIENT MANAGER

This application is a continuation of application Ser. No. 09/492,046, filed Jan. 26, 2000, now U.S. Pat. No. 6,678,735 status allowed.

FIELD OF THE INVENTION

The present invention relates generally to an improved communications system and in particular to a method and apparatus for establishing and maintaining a communication session. Still more particularly, the present invention provides a method and apparatus for a distributed processing manager using Session Initiation Protocol.

BACKGROUND OF THE INVENTION

Session Initiation Protocol (SIP) is an application-layer control protocol for transporting call setup, routing authentication and other feature messages to endpoints within the IP domain, whether those messages originate from outside the IP cloud over PSTN resources or within the cloud. These sessions include Internet multimedia conferences, Internet telephone calls, and multimedia distribution. Members in a session can communicate via multicast, via a mesh of unicast relations, or a combination of these. SIP can be used to initiate sessions as well as invite members to sessions that have been advertised and established by other means.

SIP is a text-based protocol that uses the ISO 10646 character set in UTF-8 encoding. A SIP message is either a request from a client to a server or a response from a server to a client. Both of these types of messages contain a start line, one or more header fields, or "headers", an empty line indicating the end of the header fields, and an optional message body.

In processing a SIP message, different SIP message headers have different characteristics with respect to the frequency of occurrence in SIP messages. Some headers, such as a "To" header, are generic headers that appear only once while other headers, such as "Via" headers, are generic headers that can appear any number of times. The "Via" headers, for example, provide information pertaining to the route through which a SIP communication must pass between SIP clients.

Headers, such as "CallerID", "To", and "From" headers are essential for establishing the context of the SIP message. However, from the viewpoint of an application program, maintaining other context and state information related to a session, such as storing a long sequence of Via headers, detracts from the essential task of providing a distributed application with particular functionality.

Therefore, it would be advantageous to have an apparatus and method for managing application non-essential information, such as routing information. It would further be advantageous to have an apparatus and method that presents an application program with a simplified SIP environment.

SUMMARY OF THE INVENTION

The present invention provides an apparatus, method, and system for communication using Session Initiation Protocol (SIP). A data processing system, according to the present invention, contains a network interface and a SIP client manager that receives SIP messages through the network interface. The SIP client manager contains a SIP management module and an X-SIP client module. The SIP management module contains a SIP message modifier for modifying incoming messages and outgoing messages in accordance with context information or state information for a session associated with a SIP message. The SIP management module also contains input/output controllers for receiving, sending, and forwarding SIP messages.

The X-SIP client module contains an input/output controller for receiving and sending SIP messages and a SIP application programming interface (API) for handling SIP messages for a SIP-enabled application. The X-SIP client module performs conversion of client application formatted messages, into X-SIP messages, i.e. modified SIP messages, and vice versa. The SIP management module and the X-SIP client module communicate via a socket for transmitting these messages between the SIP management module and an X-SIP client module, thereby creating a distributed SIP client architecture for managing SIP information.

When SIP messages are sent from a client application to a SIP server, the message from the client application is first received by the X-SIP client module. The X-SIP client module converts client application messages into simplified SIP messages containing, for example, the "To," "From," and the "CallerID" headers. The simplified SIP message is forwarded to the SIP management module which performs context management to determine routing information for the simplified SIP message. The SIP management module adds the routing information to the simplified SIP message to thereby create a non-simplified SIP message. The non-simplified SIP message is then forwarded to a SIP server via an IP network.

When SIP messages are received from a SIP server, the SIP message is first received by the SIP management module. The SIP management module strips the SIP message of the routing information and stores the routing information in memory. The resulting simplified SIP message is forwarded to the X-SIP client module. The X-SIP client module then converts the simplified SIP message into a client application message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

DETAILED DESCRIPTION OF THE PREFERRED EMBODIMENT

Figure 1:
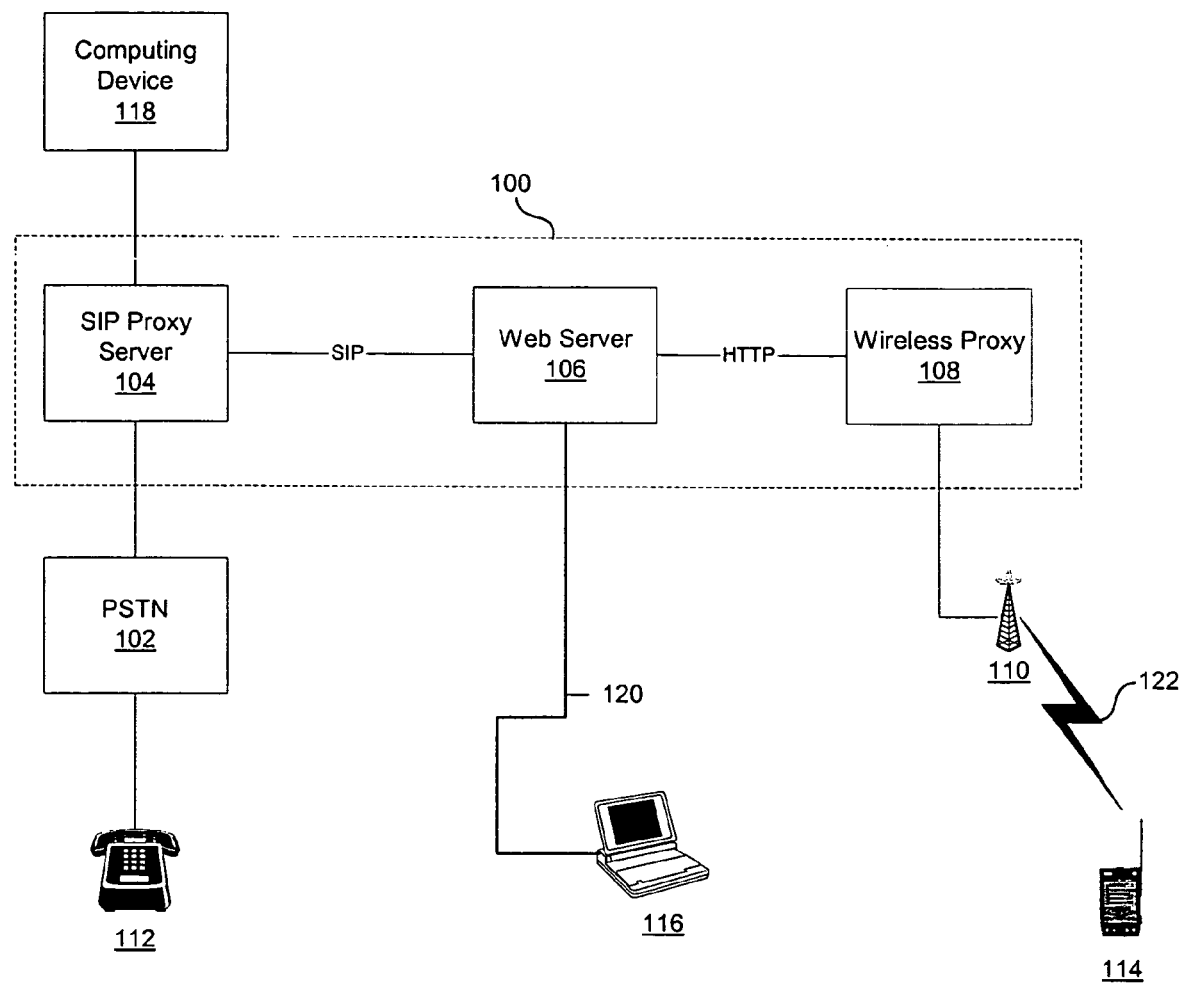
FIG. 1 is an exemplary block diagram of a wireless communications network in which the present invention may be implemented in accordance with a preferred embodiment of the present invention.

FIG. 1 is an exemplary block diagram of a communications network 100 in which the present invention may be implemented. Communications network 100 includes a Session Initiation Protocol (SIP) proxy server 104, a web server 106, and a wireless proxy 108. SIP proxy server 104 sends and receives data packets to and from a Public Switch Telephone Network (PSTN) 102 via a PSTN gateway (not shown). The PSTN 102 may then forward the data packets to telephones 112 and other communication devices that may be connected to the PSTN 102. The SIP proxy server 104 may also send and receive data packets from computing device 118 using, for example, Transmission Control Protocol (TCP) or User Datagram Protocol (UDP). The SIP proxy server 104 communicates with the web server 106 using SIP.

SIP is a textual-based signaling protocol for creating, modifying, and terminating sessions. These sessions can be multimedia conferences, Internet telephone calls, and similar applications consisting of one or more media types such as audio, video, or whiteboard. SIP invitations are used to create sessions and carry session descriptions, which allow participants to agree on a set of compatible media types. SIP requests can be sent either over TCP or UDP communication links.

Web server 106 may be connected to other servers and electronic devices (not shown) via a network such as the Internet. Web server 106 may also be connected to a wireless proxy server 108, which may be a proprietary server that communicates with portable communication and/or computing devices, such as a personal digital assistant (PDA) 114 or a cellular telephone, through wireless communication base station 110 and wireless communication link 122. Web server 106 may communicate with wireless proxy device 108 using the Hypertext Transfer Protocol (HTTP). Web server 106 may also communicate with other computing devices, such as computer 116, over communications link 120.

When a user of telephone 112 wishes to establish a communication connection with PDA 114, for example, the user initiates the communication using a telephone-based application. This may involve simply picking up the receiver of the telephone 112 and dialing a designated number for directing the telephone call via the PSTN 102 to the SIP proxy server 104, for example.

In response to receiving the call from the PSTN 102, the PSTN gateway (not shown) creates a SIP message which is routed by the SIP proxy server 104 to establish a communication connection between the SIP proxy server 104 and the web server 106. The SIP message includes all necessary information for the web server 106 to establish a communication connection to the wireless proxy device 108 and thereby, to the PDA 114 via the wireless base station 110 and communication connection 122. The PDA 114 may respond to the SIP message by sending a response signal in either a SIP format or another communication format, so long as the web server 106 is capable of converting the response message format into a format recognized by the SIP proxy server 104, such as a SIP format.

With the present invention, a SIP client manager apparatus is provided in communication links between the SIP proxy server and the PSTN 102, web server 106, and computing device 118. The SIP client manager apparatus may be a separate hardware device provided in each communication link, a single hardware device through which each of the communication links pass, or may be embodied in software running on one or more of the SIP proxy server 104, the PSTN 102, the web server 106, and the computing device 118. The SIP client manager apparatus provides a mechanism by which simplified SIP messages may be sent to and from SIP clients, as will be described hereafter.

Figure 2:
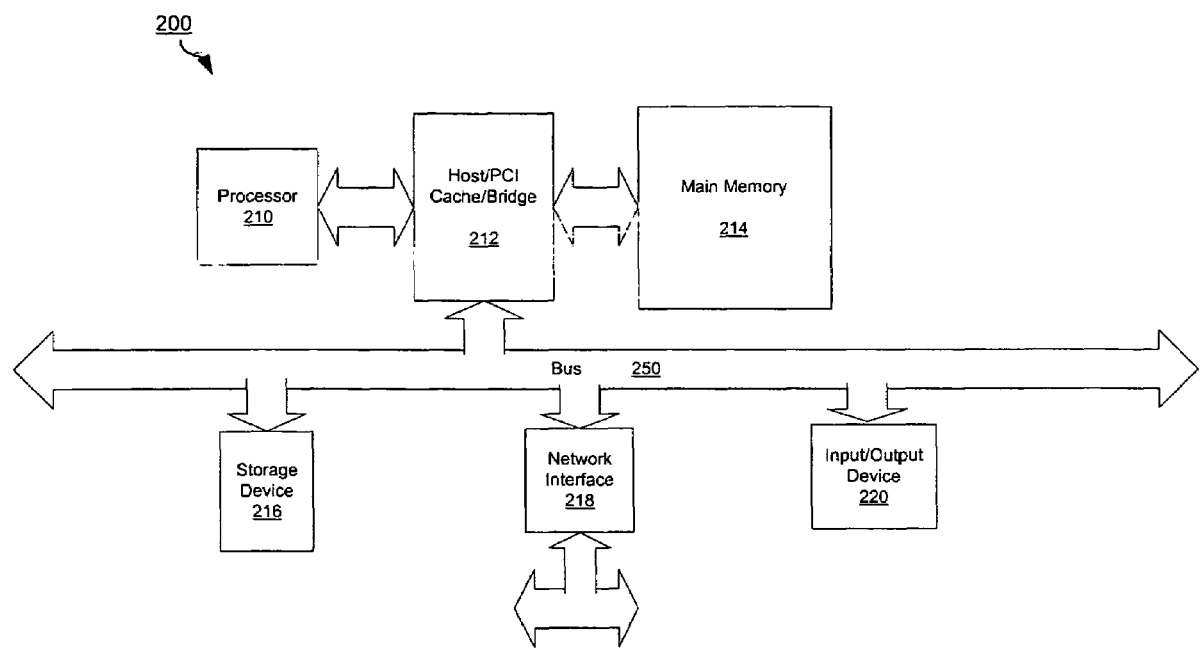
FIG. 2 is an exemplary block diagram of a data processing system in which the present invention may be implemented.

FIG. 2 is an exemplary block diagram of a data processing system 200 for implementing the SIP client manager device according to the present invention. The data processing system 200 may be implemented on a computer in which code or instructions implementing the processes of the present invention may be located. The data processing system 200 employs a peripheral component interconnect (PCI) local bus architecture. Although the depicted example employs a PCI bus, other bus architectures, such as Accelerated Graphics Port (AGP) and Industry Standard Architecture (ISA), may be used.

The data processing system 200 includes a processor 210 and main memory 214 connected to PCI local bus 250 through PCI bridge 212. The PCI bridge 212 may also include an integrated memory controller and cache memory for processor 210. Additional connections to PCI local bus 250 may be made through direct component interconnection or through add-in boards. In the depicted example, storage device 216, network interface 218, and Input/Output (I/O) device 220 are connected to the PCI local bus 250 by direct component connection, however, some or all of these devices may be connected through add-in boards.

An operating system runs on processor 210 and is used to coordinate and provide control of various components within the data processing system 200. In addition, an object oriented programming system, such as Java, may run in conjunction with the operation system and may provide calls to the operation system from Java programs or applications executing on the data processing system 200. Instructions for the operation system, the object-oriented programming system, and applications or programs may be located in the storage device 216, for example.

The data processing system 200 includes software for establishing sessions using SIP. The data processing system 200 receives application specific messages from SIP client devices via the I/O device 220 in various application specific formats, converts the application specific formats into a SIP messages, and transmits the SIP messages to the SIP proxy server 104. In addition, the data processing system 200 receives SIP messages from the SIP proxy server 104, converts the SIP messages into an application specific format, and forwards the application specific formatted messages to an appropriate SIP client device.

The depicted example in FIG. 2 and above-described examples are not intended to imply architectural limitations. Those of ordinary skill in the art will appreciate that the hardware in FIG. 2 may vary depending on the implementation. Other internal hardware or peripheral devices, such as flash ROM, optical disk drives, and the like, may be used in addition to or in place of the hardware depicted in FIG. 2. Furthermore, the processes of the present invention may be applied to a multiprocessor system.

Figure 3:
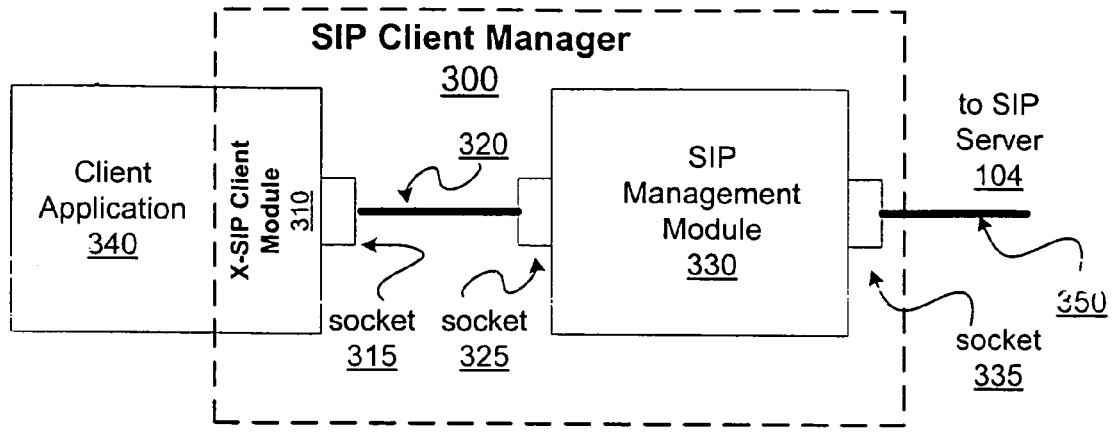
FIG. 3 is an exemplary block diagram of a SIP client manager according to the present invention.

FIG. 3 is an exemplary block diagram of the SIP client manager device 300 in accordance with a preferred embodiment of the invention. The SIP client manager device 300 includes an X-SIP client module 310, an X-SIP module socket 315, a SIP management module 330, SIP management module sockets 325 and 335, and a communication link 320 between the X-SIP module socket 315 and the SIP management module 330. The communication link 320 may be, for example, an internal TCP communication link, a network communication link, or the like.

Service requests from a client application 340 for services from a SIP server 104 are received by the X-SIP client module 310. The X-SIP client module 310 converts the application specific formatted service requests from the client application 340 into a simplified SIP message format. This simplified SIP message is then transmitted via socket 315, communication link 320, and socket 325 to the SIP management module 330. The SIP management module 330 performs appropriate processing on the simplified SIP message to add appropriate routing headers to the simplified SIP message for use in routing the service request message to the SIP server 104.

Similarly, when SIP messages are received from the SIP server 104 destined for the client application 340, the SIP messages are received by the SIP management module 330 via the SIP management module socket 335. The SIP management module 330 removes all "unnecessary" header information, such as routing headers, e.g. "Via" headers, from the SIP messages, stores the removed header information in a memory, and forwards a simplified SIP message to the client application via the sockets 315, 325, communication link 320, and X-SIP client module 310.

Although SIP is used to establish the communication links necessary to obtain services from an application server (such as web server 106), the actual service itself may use any one of a wide variety of protocols depending on the nature of the service. Thus, for example, the services provided by the application server 106 may make use of HTTP, TCP, UDP, real time streaming protocol (RTSP), and the like.

The X-SIP Client Module 310 is a simplified protocol that contains some of the components that handle information essential for communications with the SIP management module 330. For example, the simplified protocol may include the "CallerID", "To", and "From" headers as essential for determining the system context. However, a sequence of "Via" headers may not be included in the simplified protocol and may be maintained by the SIP management module 330.

The X-SIP client module 310 includes X-SIP client module socket 315 for communication with SIP management module socket 325 that is part of SIP management module 330. This structure facilitates the X-SIP client module 310 being implemented in one programming language, such as C++, and the SIP management module 330 being implemented in a different programming language, such as Java. It is particularly advantageous that SIP management module 330 be implemented in a platform-independent environment such as Java, in order to facilitate offering services from a variety of platforms. However, as those of ordinary skill in the art will appreciate, the choice of a platform independent language may vary depending upon system implementation and platform dependent languages may also be used without departing from the spirit and scope of the invention.

In a preferred embodiment, the sockets 315, 325 and 335 are standard TCP sockets and communication link 320 is a TCP communication link. Alternatively, the sockets 315, 325 and 335 may be UDP sockets, or the like. Using standard TCP sockets for communications allows X-SIP client module 310 and SIP management module 330 to run on independent computing systems that do not share processor, memory, clock, runtime support system, etc., common to a single computer platform. In other words, the client application 340, using a service from the SIP server 104 via SIP management module 330, may be distributed with respect to the SIP management module 330.

Figure 4:
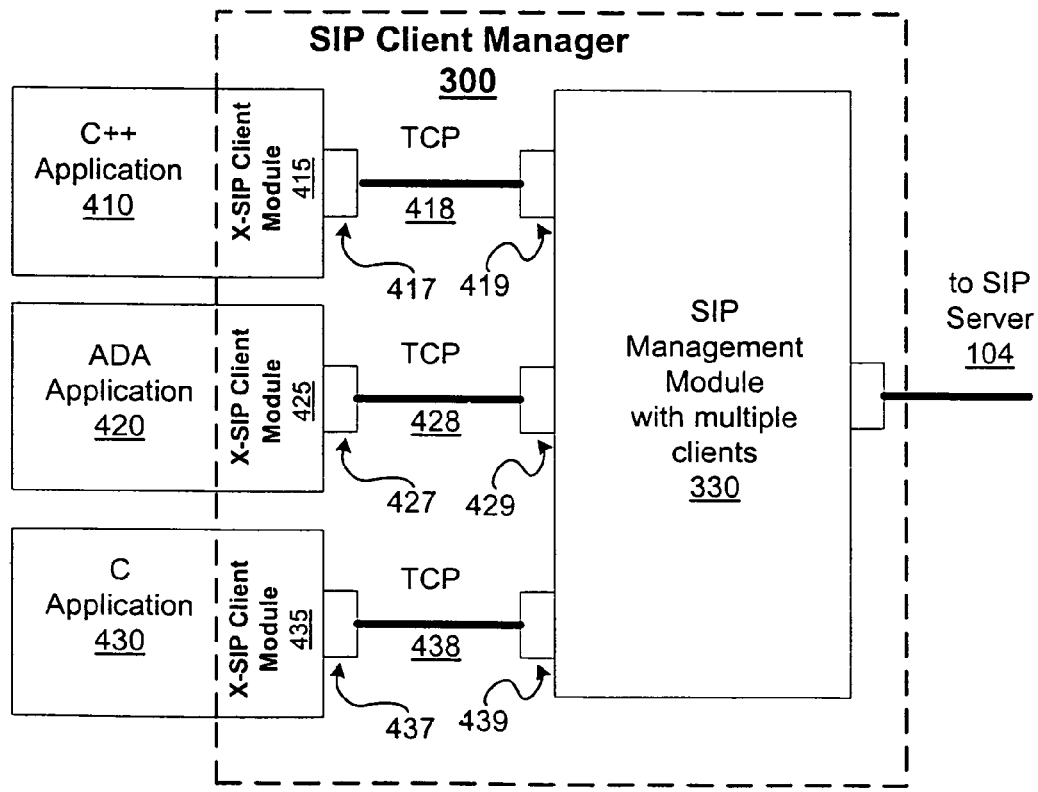
FIG. 4 is an exemplary block diagram of a SIP client manager for use with multiple clients in accordance with the present invention.

FIG. 4 is an exemplary block diagram illustrating the flexibility and advantages of the SIP client manager 300 in accordance with a preferred embodiment of the invention. The system 400 includes a single SIP management module 330 and three client applications 410, 420 and 430 communicating with the same SIP server 104. In this exemplary embodiment, system 400 contains a C++ application 410, an ADA application 420, and a C application 430, that may each initiate sessions with SIP server 104. The X-SIP client module 415, written in C++, communicates with SIP management module 330 via TCP sockets 417, 419 and the TCP communication link 418. In a similar manner, X-SIP client module 425, written in ADA, communicates with the SIP management module 330 using TCP sockets 427, 429 and TCP communication link 428 and X-SIP client module 435, written in C, communicates with the SIP management module 330 using TCP sockets 437, 439 and TCP communication link 438.

SIP client manager 300 allows client applications 410, 420 and 430, written in a variety of programming languages, to share a single SIP management module 330 using separate communication links. These client applications 410, 420 and 430 may be, for example, resident on three different machines with the SIP management module 330 on a fourth machine. Alternatively, two or more of the client applications 410, 420 and 430 may be resident on the same machine or may be resident on the same machine as the SIP management module 330. Any manner of integrating and/or distributing the client applications 410, 420 and 430 and the SIP management module 330 is intended to be within the spirit and scope of the present application.

Much of the detailed work of implementing a SIP client is contained in the SIP management module 330 and need not be implemented in each of the X-SIP client modules 415, 425 and 435. Once an X-SIP client module 415, for example, is written in one language, such as C++, it can interface with many applications, all written in C++. Therefore, as will be explained more fully below, the application programmer handles callback functions appropriate for the client application without handling all of the details concerned with the state and context of the session that must be supplied or returned in the outgoing messages.

While the above description is directed to a client application communicating with a SIP server 104, the invention is not limited to such an embodiment. Rather, the client application may communicate directly with another client application using SIP so long as both client applications include a SIP client manager 300 for facilitating conversion from client application messages to SIP messages and vice versa.

Figure 5:
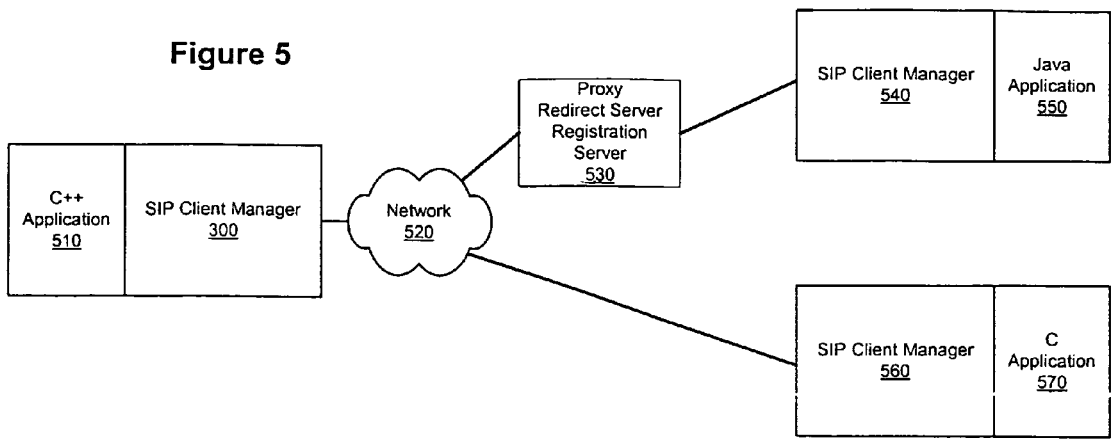
FIG. 5 is an exemplary block diagram of a SIP client manager being used in conjunction with an IP network, in accordance with the present invention.

FIG. 5, shows an exemplary block diagram illustrating how a SIP client manager 300 can be used with a TCP/IP network 520 in accordance with a preferred embodiment of the invention. As shown in FIG. 5, the client application 510 communicates with the TCP/IP network 520 through SIP client manager 300. When communicating with Java application 550, SIP messages are routed through the SIP proxy server 530. The messages are processed by SIP client manager 540 before transfer to the Java application 550.

As mentioned above, it is also possible for two SIP client managers to communicate directly. For example, SIP client manager 300 may transmit messages directly to SIP client manager 560 and may receive messages directly from SIP client manager 560. The messages are processed by SIP client manager 560 before transfer to C Application 570.

Figure 6:
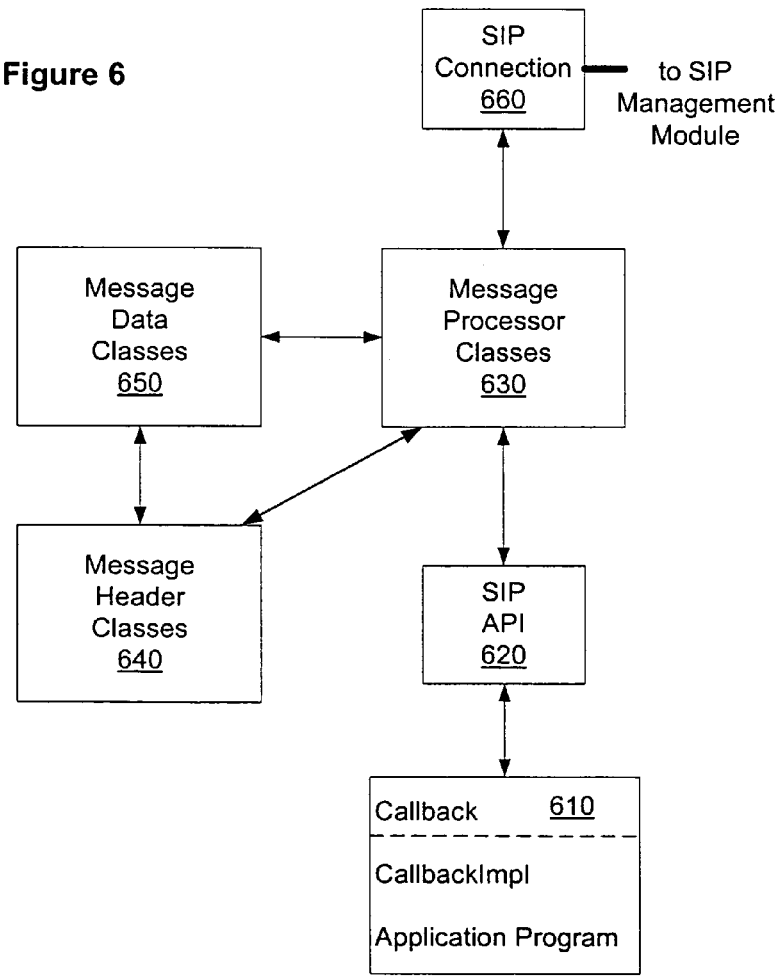
FIG. 6 is an exemplary block diagram showing the major class groupings in the X-SIP client module in accordance with the present invention.

FIG. 6 is an exemplary block diagram illustrating the major class groups for the X-SIP Client Module in accordance with the preferred embodiment of the invention. In object technology, a class is a user-defined data type that defines a collection of objects that share the same characteristics. An object, or class member, is one instance of the class. Concrete classes are designed to be instantiated. Abstract classes are designed to pass on characteristics through inheritance. The classes shown in FIG. 6 will be discussed in terms of C++ classes, however this X-SIP client module 300 could also be implemented in other programming languages, such as ADA, C, and the like.

The X-SIP client module provides an interface to the client application. In particular, the X-SIP client module provides calls to a SIP stack for various message types (invite, acknowledge, cancel, etc.) and calls back to the client application for the same types of messages. Handling of responses is through callback functions. The X-SIP client module provides an abstract callback class 610 where the actual implementation is in a CallbackImpl class defined for the particular application. This is appropriate since the action to be performed for various responses from the SIP server 104 is dependent on the application itself and is not part of SIP.

Figure 7:
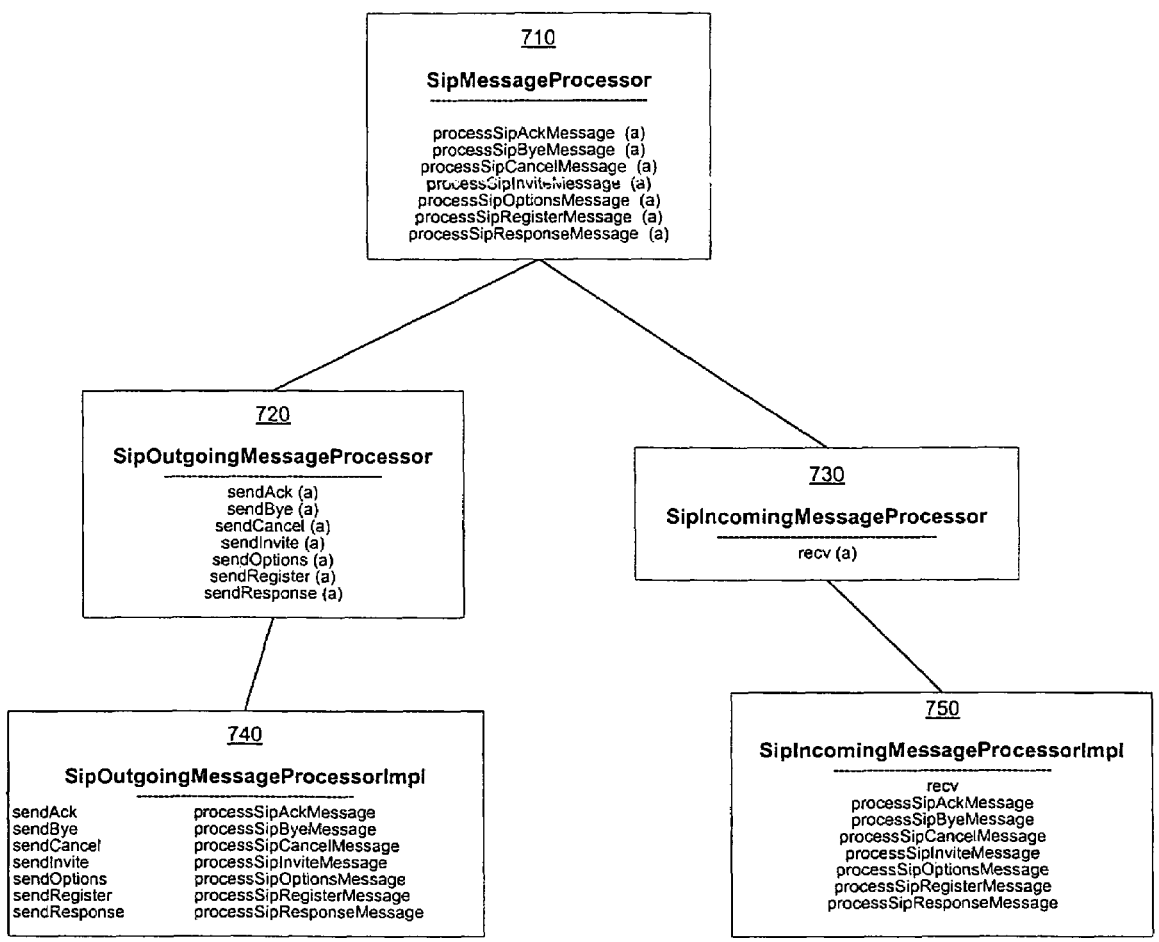
FIG. 7 is an exemplary diagram of a class hierarchy for the message processor classes in the X-SIP client module.

The X-SIP client module provides SIP API 620 primarily for communicating with MessageProcessorClasses 630 to send requests and receive responses. The MessageProcessorClasses 630 rely on MessageDataClasses 650 and MessageHeaderClasses 640 to carry out the details of sending and receiving responses, as will be described in more detail below. The SIP Connection 660 class actually performs the send and receive operations though the TCP socket associated with the X-SIP client module. FIG. 7 is an exemplary diagram illustrating a class hierarchy of the message processor classes in accordance with a preferred embodiment of the invention. The primary methods associated with each class are listed. In object technology, a method is the processing that an object performs. When a message is sent to an object, the method is implemented. Constructors, destructors, and utility methods are not included in these lists.

The SipMessageProcessor class 710 is an abstract class containing methods to handle the seven message types: Ack, Bye, Cancel, Invite, Options, Register, and Response. Since all these methods are abstract, they must be defined completely in the appropriate implementation classes.

The SipOutgoingMessageProcessor class 720 adds additional abstract methods appropriate for sending messages. In particular, there is a send method for each of the seven message types. The SipOutgoingMessageProcessorImpl class 740 is a concrete class that actually implements the fourteen abstract methods from the parent classes.

The SipIncomingMessageProcessor class 730 adds a single abstract method appropriate for receiving messages, namely the method recv. The SipIncoming MessageProcessorImpl class 750 is a concrete class that actually implements the eight abstract methods from the parent classes.

Figure 8:
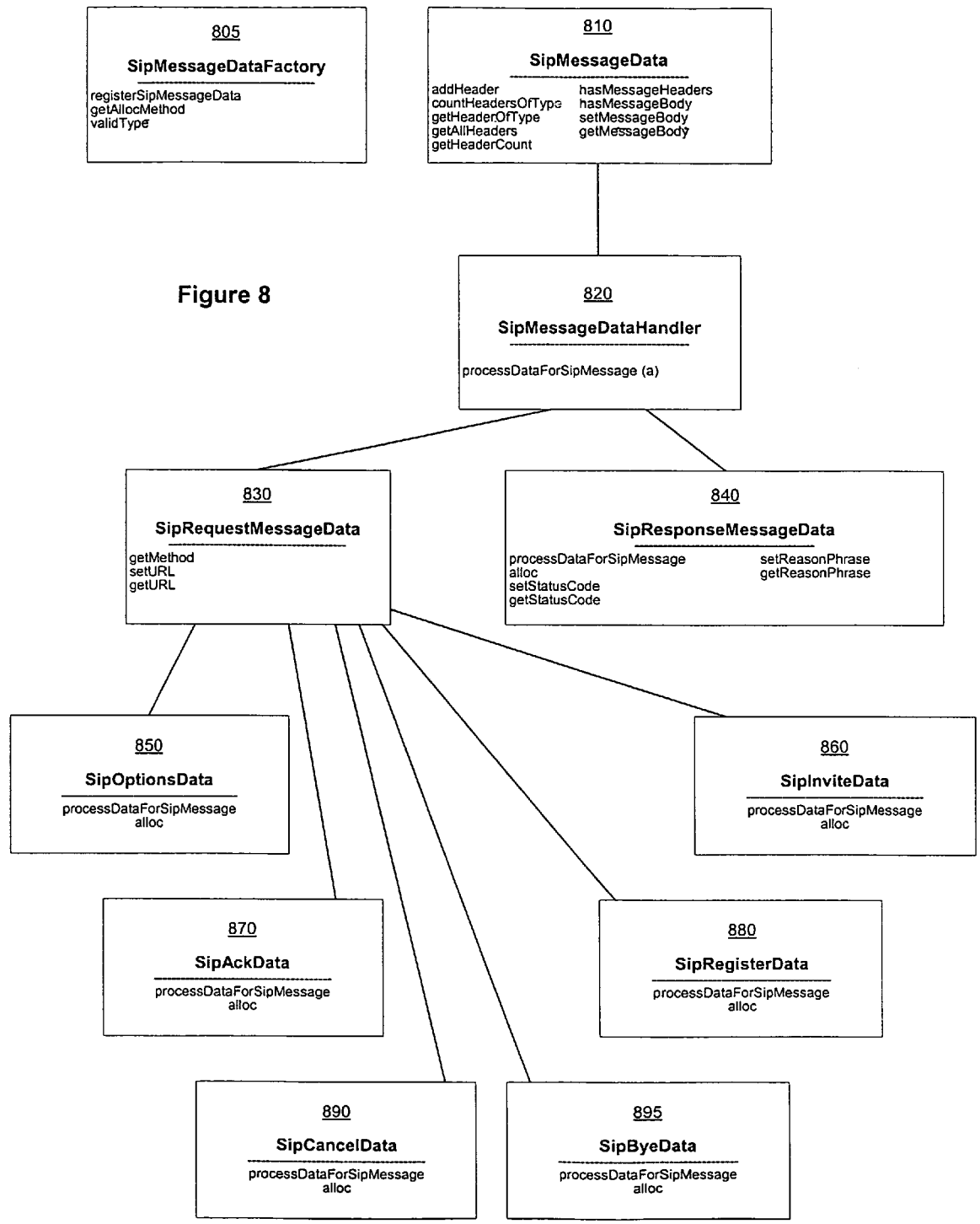
FIG. 8 is an exemplary diagram of a class hierarchy for the message data classes in the X-SIP client module.

FIG. 8 is an exemplary diagram illustrating a class hierarchy diagram for the message data classes in accordance with a preferred embodiment of the invention. As shown in FIG. 8, the SipMessageData class 810 contains a variety of methods to process the message headers and the message body of a SIP message. The names of the methods indicate their functionality and include several get methods.

The SipMessageDataHandler class 820 adds a single abstract method, processDataForSipMessage. Implementation of this method is delayed until the appropriate subclass. The SipMessageDataHandler is the overall container of the SIP message data. The processDataForSipMessage method decodes the SIP message based on an appropriate subclass.

The SipMessageDataHandler class 820 is divided into two subclasses: SipRequestMessageData 830 for request messages and SipReponseMessageData 840 for responses. There are six request message types with each of the six request message types having a subclass: SipOptionsData 850, SipAckData 870, SipCancelData 890, SipByeData 895, SipRegisterData 880, and SipInviteData 860. The parent class, SipRequestMessageData 830, contains methods get-Method, getURL, and setURL that are available to the subclasses. Each subclass implements the abstract methods processDataForSipMessage and alloc. The SipReponseMessageData class 840 implements the abstract methods processDataForSipMessage, alloc, and get/set methods for StatusCode and ReasonPhrase.

In object-oriented programming, it is fairly common to write factory classes associated with other classes. This approach allows deferral of instance creation to the appropriate subclass. SipMessageDataFactory 805 is such a class. The getAllocateMethod returns an alloc method appropriate for the subclass.

Figure 9:
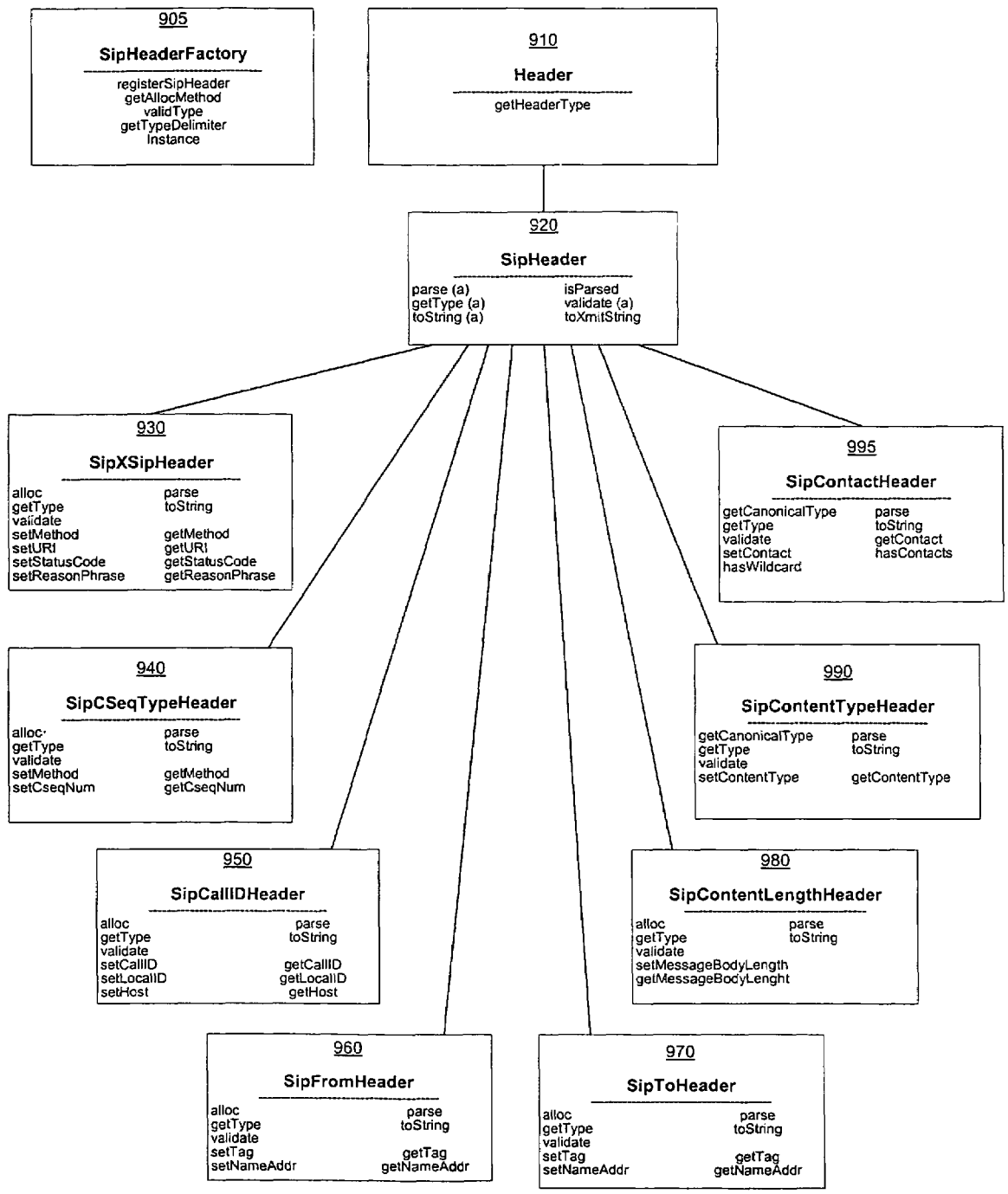
FIG. 9 is an exemplary diagram of a class hierarchy for the header classes in the X-SIP client module.

FIG. 9 is an exemplary class hierarchy diagram illustrating the header classes in accordance with the preferred embodiment of the invention. Header 910 is the parent class that contains a get method for the header type. Subclass SipHeader 920 contains four abstract methods (parse, getType, toString, and validate) and two other methods (isparsed and toXmitString). There are eight types of headers processed:

SipXSipHeader 930, SipCseqTypeHeader 940, SipCallIDHeader 950, SipFromHeader 960, SipToHeader 970, SipContentLengthHeader 980, SipContent Type Header 990, and SipContact Header 995.

In addition to implementing the four abstract methods from SipHeader 920, an alloc method is implemented, an output method, and get/set methods as appropriate for the header type. Finally, SipHeaderFactory 905 defers instance creation to the appropriate subclass of header types.

Figure 10:
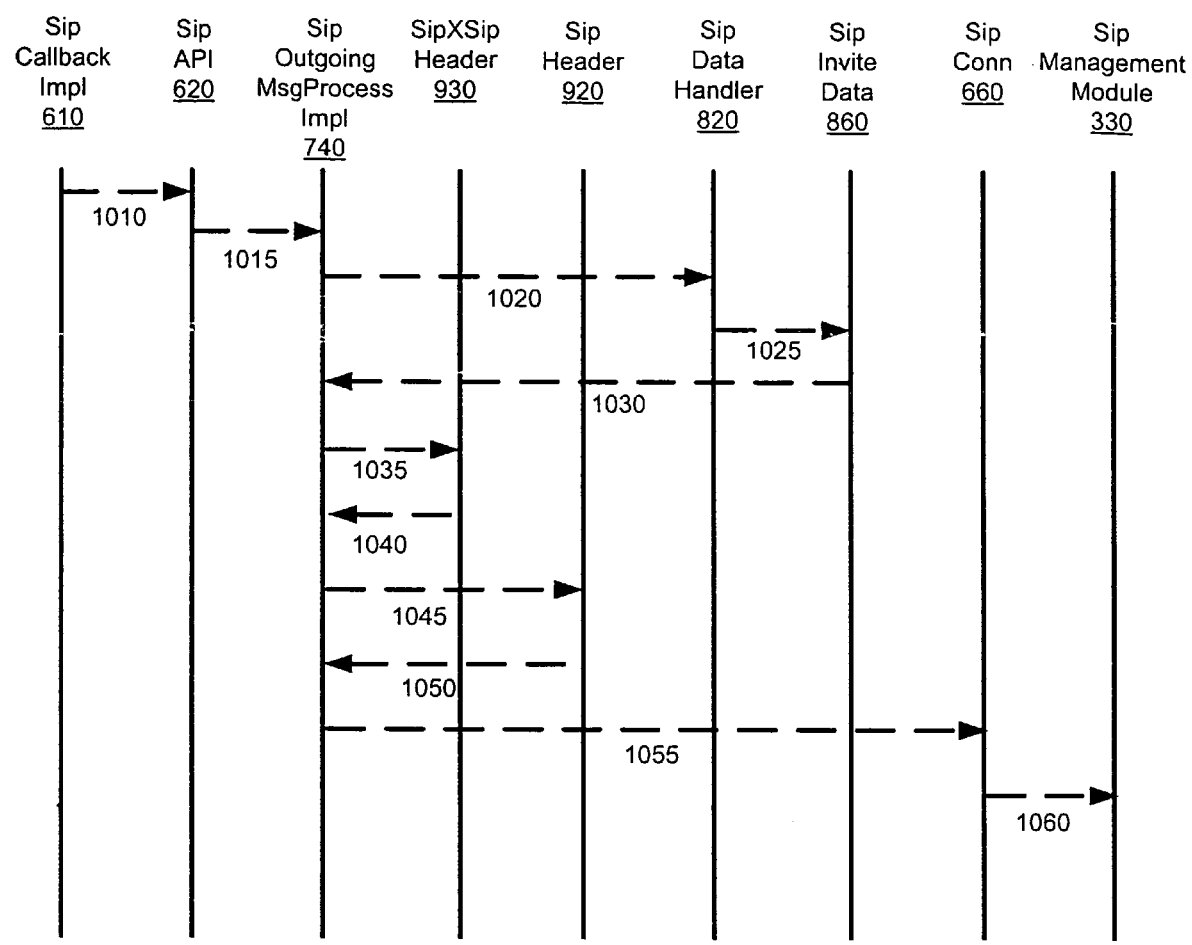
FIG. 10 is an exemplary event flow trace diagram of outgoing message processing in the X-SIP client module in accordance with the present invention.
Figure 11:
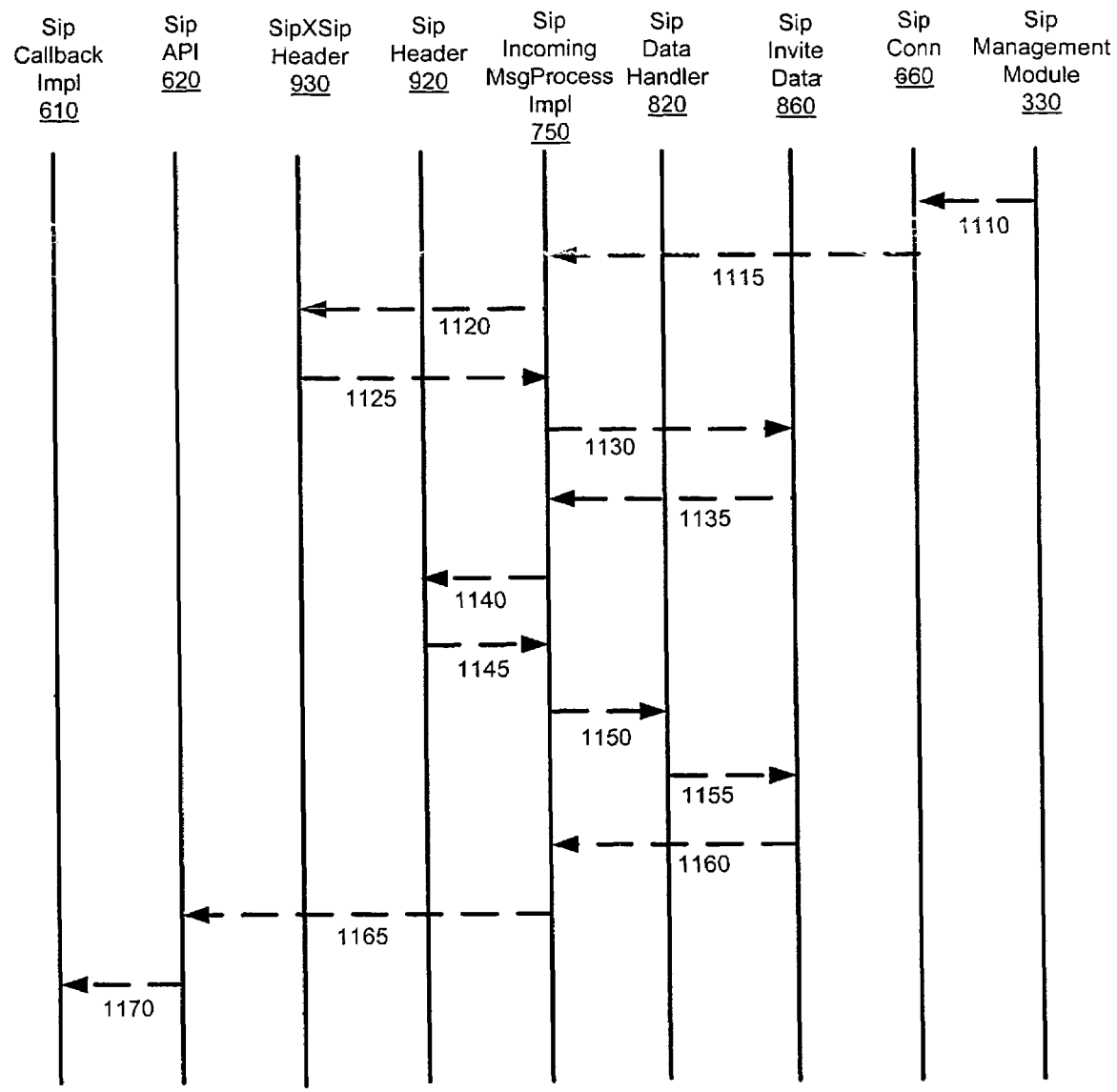
FIG. 11 is an exemplary event flow trace diagram of received message processing in the X-SIP client module in accordance with the present invention.

An example event flow of the X-SIP client module 310 will now be described with reference to FIGS. 10 and 11 and various classes from FIGS. 6-9. While FIGS. 10 and 11 illustrate an invite message, other message types are processed in a similar manner. FIGS. 10 and 11 are simplified diagrams in that all details are not shown, such as the use of the factory methods. However, FIGS. 10 and 11 provide an overview of how the classes described above work together to process requests to and from a SIP server 104.

FIG. 10 is an exemplary event flow diagram illustrating the general processing of an outgoing message in accordance with a preferred embodiment of the invention. As shown in FIG. 10, in step 1010, the appropriate request message callback 610 (FIG. 6) is first invoked, the invite request in the present example. In step 1015, the callback is passed through the SIP API 620 (FIG. 6) to the SipOutgoing MessageProcessorImpl 740 (FIG. 7). In step 1020, the outgoing message processor calls the SipMessageDataHandler 820 (FIG. 8) which in step 1025, calls SipInviteData 860 (FIG. 8). SipInviteData 860 returns its result to SipOutgoing MessageProcessorImpl 740, in step 1030, which then formulates the desired message based on interactions (steps 1035-1050) with SipHeader 920 and SipXSipHeader 930 (FIG. 9).

Once the appropriate message is formed, it is sent to SipConnection 660 (FIG. 6), in step 1055, for transmission through the TCP socket to the SIP management module 330, described in more detail further below. The SIP management module 330 then sends the SIP request to the remote SIP Server 104.

FIG. 11 is an exemplary event flow diagram illustrating the general processing of an incoming message in accordance with a preferred embodiment of the invention. As shown in FIG. 11, in step 1110, the incoming message is processed by the SIP management module 330 and passed to SipConnection 660, which, in turn, passes the message on to SipIncomingMessageProcessorImpl 750 in step 1115. The incoming message processor uses methods from SipXSipHeader 930 (steps 1120 and 1125), SipInviteData 860 (steps 1130 and 1135), and SipHeader 920 (steps 1140 and 1145) to process the response. Then, in step 1150, SipDataHandler 820 is called which, in step 1155, calls SipInviteData 860 to pass a final response back to SipIncomingMsgProcessorImpl 750 (step 1160). In step 1165, SipIncomingMsgProcessorImpl 750 calls the SIP API 620 which then, in step 1170, forwards the request to the client application through SipCallbackImpl 660.

Figure 12:
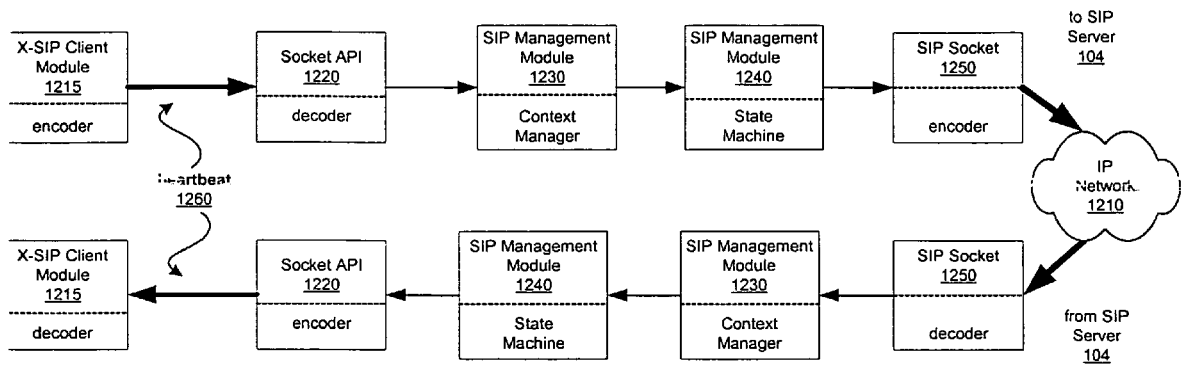
FIG. 12 is an exemplary data flow diagram illustrating processing of a SIP message in the SIP client manager in accordance with the present invention.

FIG. 12 is an exemplary data flow diagram illustrating the major processing components of the SIP client manager 300 in accordance with a preferred embodiment of the invention. The top part of the diagram illustrates a request being sent from a client application through the SIP client manager 300 to a SIP server 104 on an IP network 1210. The bottom part of the diagram illustrates the processing of a response from the SIP server 104 on the IP network 1210 through the SIP client manager 300 and back to the client application.

X-SIP client module 1215 contains an encoder for encoding the outgoing request. The outgoing request is encoded so that it forms a message with a start line, a sequence of header lines, a blank line to indicate the end of the headers, and an optional message body, as described above. The SIP management module contains socket API 1220 for communication with X-SIP client module 1215. The socket API 1220 includes a decoder to decompose the message into its constituent parts.

Two of the major components of the SIP management module are context manager 1230 and the state machine 1240. Context management performed by the context manager 1230 includes management of the essential components, e.g., CallerID, To, From, and other information, e.g., the Via Headers, in the SIP messages. The SIP standard provides an outline of a state machine, however the invention goes beyond this basic functionality, particularly with regard to error handling. SIP socket 1250 provides an interface for the SIP client manager 300 to SIP server 104 via the IP Network 1210.

With the elements shown in FIG. 12, the X-SIP client module 1215 encodes a message from the client application with essential information such as the "To", "From" and "CallerID" headers. The message is sent to the context manager 1230 of the SIP management module via the socket API 1220. The context manager 1230 stores, for example, the essential information from the message and provides other non-essential information, such as routing headers, to be encoded in the message. The state machine 1240 responds to events and determines the next action to be taken. The message information is then forwarded to the SIP socket 1250 which encodes the message, including the routing information, and transmits the message to the SIP server 104 via the IP network 1210.

The process is reversed when a response message is sent from SIP Server 104 to SIP socket 1250 where the message is decoded. Context Manager 1230 maintains all the routing information and strips this information from the message sent to the client application. In particular, the headers for Via, Route, and Record Route are removed and retained in SIP management module context manager 1230. SIP management module state machine 1240 determines the appropriate action based on the events that have occurred. The response is forwarded to API socket 1220 for encoding and transfer using, for example TCP, to X-SIP client module 1215. X-SIP client module 1215 decodes the message and passes it to the client application for processing.

The advantages of separating the SIP client manager into an X-SIP client module 1215 and a SIP management module 1230, 1240 that communicate via, for example, a TCP link include an ability to be implemented in different languages and possibly distributed on different computer systems. Once processing has been distributed between machines, the system has the responsibility of insuring the components are communicating properly. This is handled in the SIP client manager by providing heartbeat checks 1260. At predetermined time intervals, X-SIP client module 1215 sends a heartbeat message to socket API 1220 in the SIP management module. This message is detected during the decoding process and a heartbeat response is sent back from the encoder of socket 1220 to X-SIP client module 1215. When the X-SIP client module 1215 decoder recognizes the heartbeat response, it knows that the communications channel is functional. If no response is received after a reasonable delay time, dependent on the actual system environment, another heartbeat message is sent. If no response is received after several heartbeat messages, the application program can be notified of a communications exception and take appropriate action.

Figure 13:
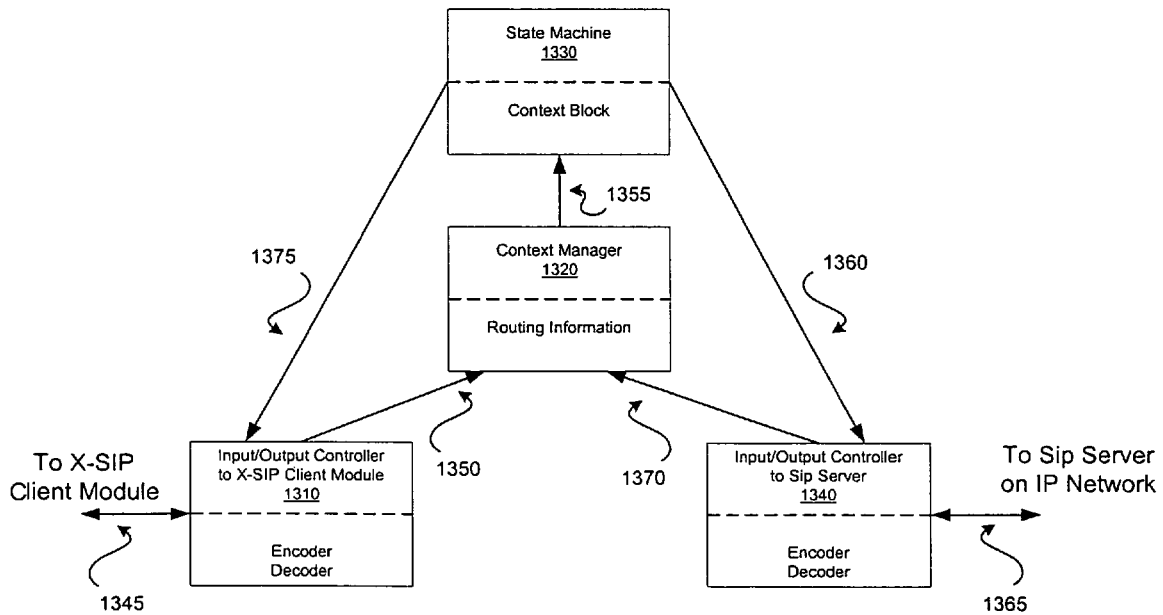
FIG. 13 is an exemplary block diagram of the SIP management module structure in accordance with the present invention.

With reference now to FIG. 13, a structural diagram illustrates a hierarchical view of the major processing components of the SIP client manager in accordance with a preferred embodiment of the invention. FIG. 13 can be contrasted with the data flow diagram in FIG. 12 which shows some of the same components, such as SIP socket 1250.

The input/output controller 1310 controls the information transfer between the SIP management module and the X-SIP client module socket. The context manager 1320 keeps track of the routing information for messages, either removing this information from the message before sending the message to the application or adding this information when a message is being sent to the IP network. The state machine 1330 responds to events and determines the next action. This state machine 1330 may be extended beyond that specified by the SIP standard and, in particular, may be more robust in handling error conditions. The input/output controller 1340 controls the transfer of information with the SIP server on the IP network.

For example, the application may send a request to the SIP management module via a TCP connection 1345. The input/output controller 1310 decodes this request and sends information 1350 to context manager 1320. The context manager 1320 uses the "To," "From," and "CallerID" headers to determine if a context already exists or if one has to be created. Message 1355, with complete routing information is sent to state machine 1330. The state machine 1330 determines the next action or if an error has occurred. Request 1360 is then forwarded to the input/output controller 1340 for encoding. Encoded message 1365 is sent to the SIP server on the IP network.

The SIP server on the IP network may respond to the request with encoded message 1365 coming into the input/output controller 1340 for decoding. Decoded message 1370 is sent to context manager 1320 for processing. Since this is an incoming message, the routing information is removed and stored. If the state machine 1330 exists for this context, then response 1355 is sent forward. If there is no state machine yet for this context, then state machine 1330 is created and message 1355 is forwarded to it. The state machine 1330 determines the next action or if an error has occurred. A response 1375 is then forwarded to the input/output controller 1310 for encoding. The encoded message 1345 is sent to the client application via the TCP connection.

Figure 14:
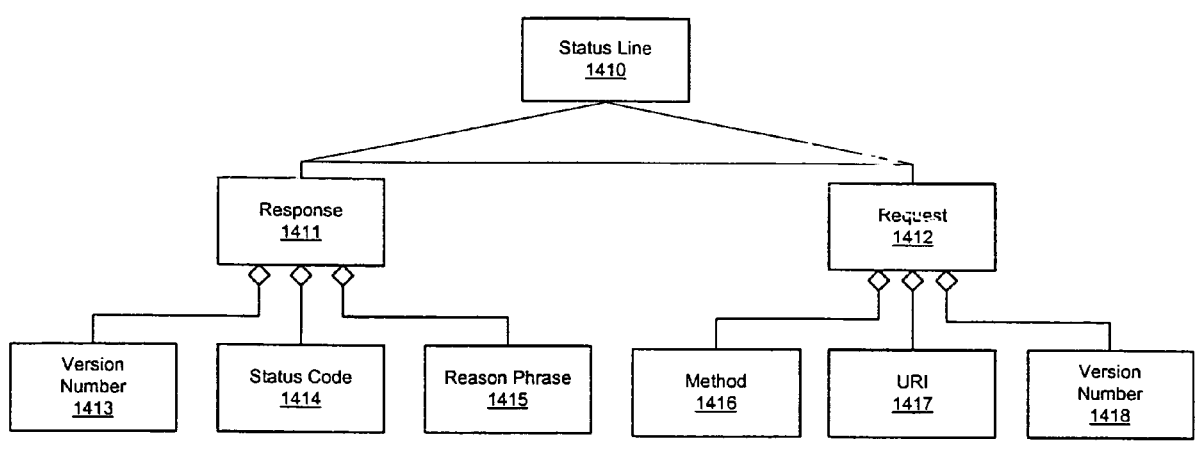
FIG. 14 is an exemplary diagram illustrating a comparison of the status line and an X-SIP header in accordance with the present invention.
Figure 14:
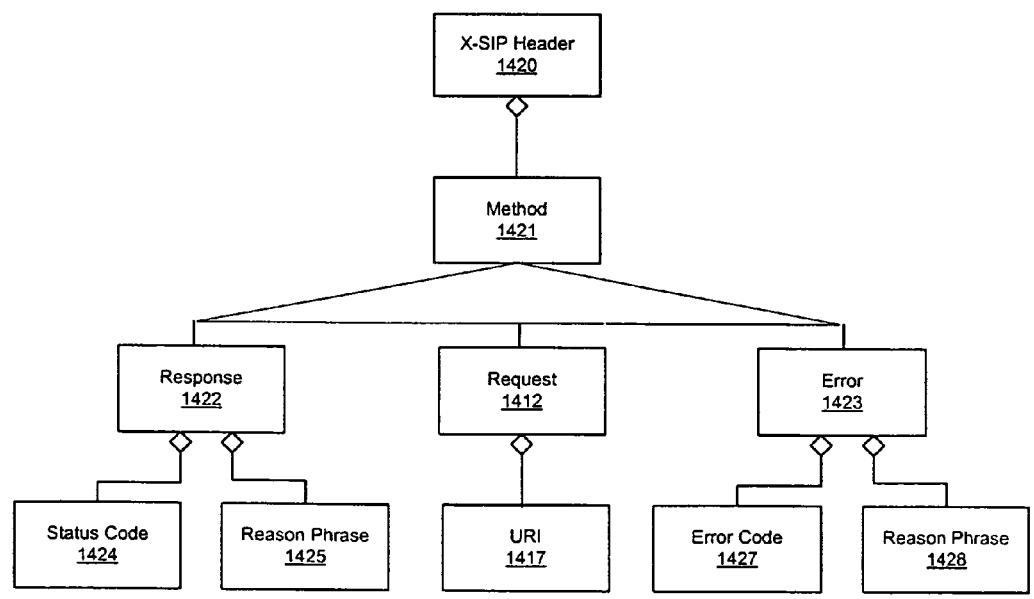

FIG. 14 is an exemplary block diagram for comparing the status line for a normal SIP message 1410 and a X-SIP header 1420 used in accordance with a preferred embodiment of the invention. The top part of the diagram shows a standard SIP status line 1410. The bottom part of the diagram shows an X-SIP header 1420 that is similar to the SIP status line 1410 except that some information has been removed (e.g., the version numbers 1413 and 1418) and additional information has been added concerning error tracking 1423, 1427 and 1428. The communications between the X-SIP client module socket and the SIP management module use the X-SIP header 1420 format while communications between the SIP management module and the SIP server on the IP network use the standard SIP status line 1410. The SIP management module provides the conversion between these formats.

According to the SIP standard, status line 1410 contains response 1411, which, in turn, contains version number 1413, status code 1414, and reason phrase 1415. SIP status line 1410 contains request 1412, which, in turn, containing method 1416, Uniform Resource Identifier (URI) 1417 and version number 1418.

There are two primary differences between the SIP status line 1410 and the X-SIP header 1420: the version number information 1413 and 1418 is removed and new error information 1423, 1427 and 1428 is added. In particular, X-SIP header 1420 contains method 1421 which in turn contains response 1422, Uniform Resource Identifier (URI) 1426 and error 1423. The response 1422 contains status code 1424 and reason phrase 1425. The error 1423 contains error code 1427 and reason phrase 1428.

The significance of the difference between the SIP status line 1410 and the X-SIP header 1420 is that the X-SIP header 1420 is able to transfer information that is not transferrable using the SIP header. In other words, the SIP header cannot support the error header 1423.

For example, if a client application sends an improperly formatted SIP message, an error will occur when the SIP message is parsed for the various header information. The identification of this error may be forwarded to the recipient client application using the error header 1423. Thus, even though an error has occurred in the transmission of a SIP message to the recipient client application, the recipient client application may be informed of the error and may be able to recover some of the SIP message information. In this way, the entire SIP message will not be lost due to an error in formatting and some, if not all, of the SIP message may be recoverable.

Thus, with the present invention, client applications do not need to know the details of routing information for forwarding client application messages to a server or other client application. The SIP client manager applies SIP message routing information to outgoing messages and strips off the routing information from received SIP messages. Furthermore, with the present invention, a single SIP client manager may be used with a plurality of client applications running under different programming languages and different client application message formats.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the present invention is not limited to a network distributed system as all of the application and SIP clients may be present within a single data processing system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for communicating using a text based communication protocol, the data processing system comprising:
    a network interface; and
    a client manager, wherein the client manager receives a message through the network interface, wherein the message is generated using the text based communication protocol, and wherein the client manager comprises a message modifier for modifying the message in accordance with context information associated with the message, wherein the context information includes message routing information, wherein the message modifier modifies the message by removing the message routing information from the message when the message is incoming, wherein the message modifier modifies the message by adding the message routing information to the message when the message is outgoing, wherein the client manager receives a client application message from a client application and converts the client application message into a simplified SIP message that does not include the message routing information.

2. The data processing system of claim 1, wherein the message routing information includes at least one of a via header, a route header and a record route header.

3. The data processing system of claim 1, wherein the message is received from a server.

4. The data processing system of claim 1, wherein the message is received from a client application.

5. The data processing system of claim 1, wherein the message modifier modifies the message when the message is outgoing by adding at least one of a "Via" header, a "Route" header, and a "Record Route" header to the message.

6. The data processing system of claim 1, wherein the client manager includes an input/output controller for receiving the message and a decoder for decoding the message.

* * * * *